United States Patent
Lemos et al.

(10) Patent No.: US 12,255,574 B2
(45) Date of Patent: Mar. 18, 2025

(54) PHOTOVOLTAIC MODULE ACCESSORY CLAMP

(71) Applicant: Wencon Development, Inc., Walnut Creek, CA (US)

(72) Inventors: Robert A. Lemos, Walnut Creek, CA (US); Duane Menton, Vallejo, CA (US)

(73) Assignee: Wencon Development, Inc., Hayward, CA (US)

( * ) Notice: Subject to any disclaimer, the term of this patent is extended or adjusted under 35 U.S.C. 154(b) by 484 days.

(21) Appl. No.: 15/328,052

(22) PCT Filed: Jul. 22, 2014

(86) PCT No.: PCT/US2014/047693
§ 371 (c)(1),
(2) Date: Jan. 22, 2017

(87) PCT Pub. No.: WO2016/014042
PCT Pub. Date: Jan. 28, 2016

(65) Prior Publication Data
US 2017/0207743 A1 Jul. 20, 2017

(51) Int. Cl.
*H02S 20/20* (2014.01)
*H02S 40/32* (2014.01)

(52) U.S. Cl.
CPC .............. *H02S 20/20* (2014.12); *H02S 40/32* (2014.12)

(58) Field of Classification Search
CPC .......... H02S 20/20; H02S 20/30; H02S 20/32; F16B 2/02; F16B 2/065

(Continued)

(56) References Cited

U.S. PATENT DOCUMENTS

| 4,833,848 | A | * | 5/1989 | Guerin | E04B 2/7403 |
| | | | | | 52/242 |
| 6,377,449 | B1 | * | 4/2002 | Liao | G06F 1/187 |
| | | | | | 248/65 |

(Continued)

FOREIGN PATENT DOCUMENTS

WO  WO-2014137461 A1 * 9/2014 ................ F16L 3/26

OTHER PUBLICATIONS

PennEngineering; Self-Clinching Nuts Brochure; copyright 2009; pp. CL-1 to CL-12; https://www.pemnet.com/fastening_products/pdf/cldata.pdf (Year: 2009).*

*Primary Examiner* — Lindsey A Buck
(74) *Attorney, Agent, or Firm* — Temmerman Law; Mathew J. Temmerman

(57) ABSTRACT

A bracket assembly for mounting a plurality of photovoltaic (PV) accessories, the bracket assembly comprises a first bracket and a second bracket. The first bracket comprises a first clamp member and a second clamp member attached by means of a tightening means. The first clamp member includes a first plate and a second plate with an opening being attached to form an angle therebetween. The second clamp member includes a clamp plate with a slot and a pair of flanges. The second bracket comprises an attachment structure having a pair of outer channels with a structural member connected therebetween and a middle channel attached and positioned at a lower plane with the structural member, a pair of arms and a plurality of flanges attached to a distal end of the pair of outer channels, the middle channel and the pair of arms.

14 Claims, 10 Drawing Sheets

(58) Field of Classification Search
USPC ... 248/237, 226.11, 65, 73, 674, 122.1, 200, 248/220.21, 220.22, 220.41
See application file for complete search history.

(56) References Cited

U.S. PATENT DOCUMENTS

| | | | | |
|---|---|---|---|---|
| 8,109,048 | B2* | 2/2012 | West | F24S 25/20 52/173.3 |
| 8,505,864 | B1* | 8/2013 | Taylor | F24S 25/636 248/237 |
| 2006/0086382 | A1* | 4/2006 | Plaisted | F24S 25/10 136/246 |
| 2007/0262219 | A1* | 11/2007 | Hutter, III | B64C 1/406 248/229.1 |
| 2009/0019796 | A1* | 1/2009 | Liebendorfer | F24S 25/35 52/173.3 |
| 2009/0114269 | A1 | 5/2009 | Fletcher et al. | |
| 2009/0166494 | A1 | 7/2009 | Bartelt-Muszynski et al. | |
| 2010/0019116 | A1 | 1/2010 | Christen | |
| 2011/0000544 | A1* | 1/2011 | West | H02S 20/30 136/259 |
| 2011/0220180 | A1* | 9/2011 | Cinnamon | H02S 40/36 136/251 |
| 2011/0265860 | A1 | 11/2011 | Ciasulli et al. | |
| 2011/0302857 | A1* | 12/2011 | McClellan | F24S 25/35 52/173.3 |
| 2012/0285103 | A1* | 11/2012 | Canavarro | E04B 2/7416 52/27 |
| 2014/0048498 | A1* | 2/2014 | Kuan | H01L 31/048 211/41.1 |
| 2014/0110543 | A1 | 4/2014 | Aliabadi et al. | |
| 2014/0168927 | A1 | 6/2014 | Morris et al. | |
| 2016/0018026 | A1* | 1/2016 | Shelton | F16M 13/022 248/65 |

* cited by examiner

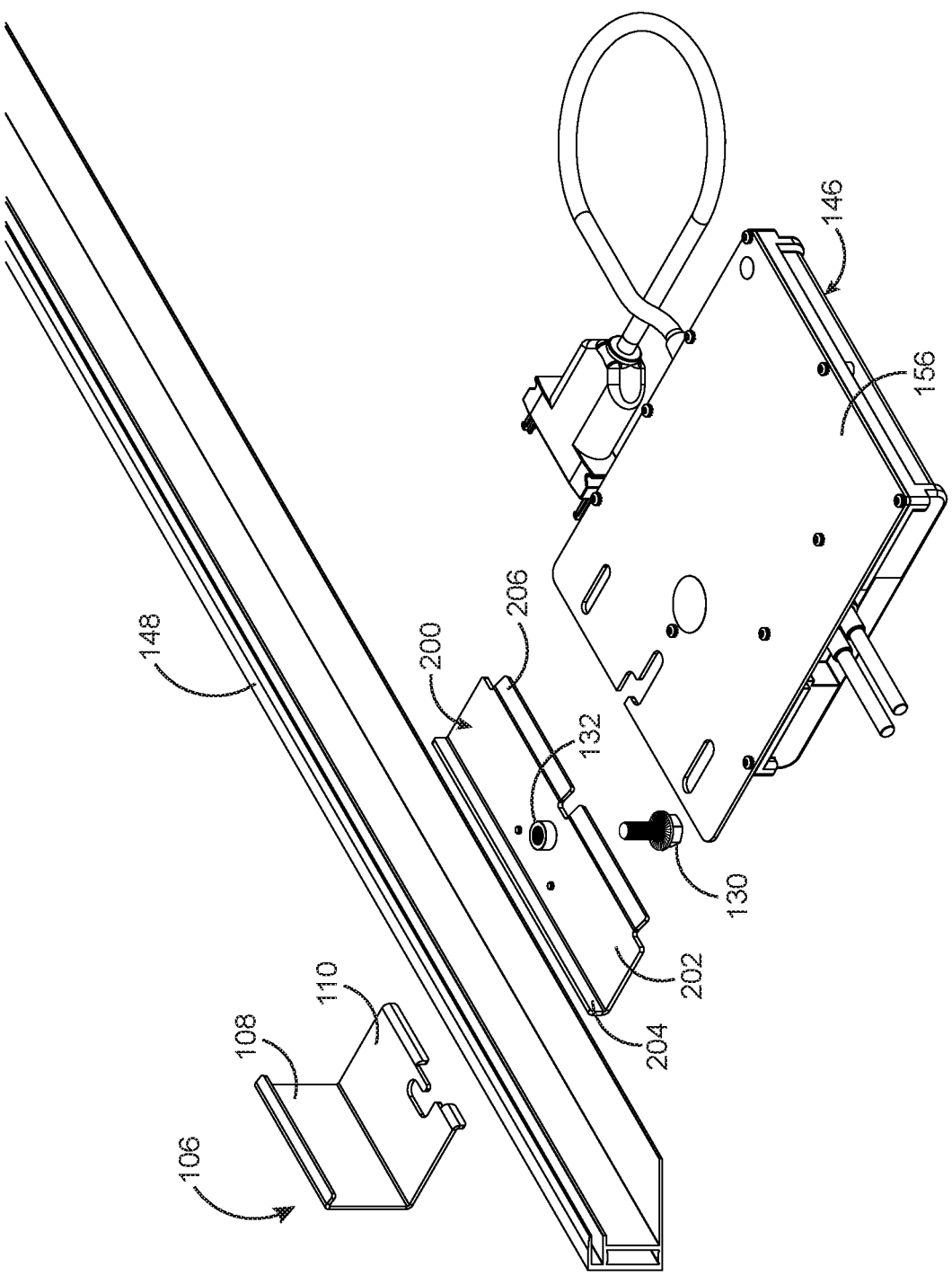

PHOTOVOLTAIC MODULE ACCESSORY CLAMP

This application claims priority under 35 U.S.C § 371 to PCT application No. PCT/US2014/047693, filed Jul. 22, 2014. The disclosure of that applications is incorporated herein as if set out in full.

BACKGROUND OF THE DISCLOSURE

Technical Field of the Disclosure

The present embodiment relates in general to bracket assemblies. More specifically, the present disclosure relates to a bracket assembly for mounting solar panel accessories to a photovoltaic (PV) system and a method for mounting the bracket assembly.

Description of the Related Art

Solar photovoltaic (PV) systems require installation of some type of solar accessories to control the flow of energy within the system. In the most common PV systems, the PV array is connected directly to a micro inverter that converts the DC energy produced by the PV array into AC energy that is directly connected to an electric utility. These inverters are typically connected to a single PV module via connecting wires and junction boxes that convert the module's DC power directly into AC. These inverters are connected together to parallel the AC output. With the increased use of photovoltaic (PV) systems, bracket assemblies that will attach the solar accessories like micro-inverters, connecting wires, junction boxes etc. with the solar panel or rails have been developed. In recent years, various kinds of bracket assemblies are in use which provide for the installation of solar accessories with the rail of the PV module. Bracket assemblies come in a variety of sizes and patterns to meet installation purposes. However, most of the bracket assemblies penetrate through the rail or the PV module and can damage the expensive module which reduces the overall efficiency of the PV system.

Conventional bracket assemblies for attaching PV module accessories with the rail have considerable drawbacks. For example, many bracket assemblies utilize screws, bolts, washers, and nuts to secure the PV accessories with the rail/module by inserting these bracket assemblies through the pre-drilled holes on the rail/module. Such bracket assemblies are difficult to use and can require additional manpower to install. Also, such devices penetrate through the rail/module and can cause damage to the rail/module, decreasing the overall efficiency of the PV system. The wires must be secured to the rail and free from potential damage. The traditional bracket assemblies can abrade the wires against the roof surface, leading to potential faults. In areas of high snow and ice events, loose wiring can get pulled, damaging connection points and module junction boxes.

One of the existing bracket assemblies comprises a first bracket part with a first spherical surface, a second bracket part with a second spherical surface and a fastening element for fastening the first bracket part movably to the second bracket part. The second bracket part comprises a groove and the fastening element is at least partly placed in the groove. However, this bracket due to its spherical geometry can be employed solely for holding spherical or circular objects. Further, this bracket cannot directly attach/clip the PV accessories with the rail of the photovoltaic system and requires a fastening element.

Another existing bracket assembly discloses a support member that includes a plurality of support joists and support rails braced at an incline. Each support rail is tubular and generally rectangular, having a lower wall section with a T-slot channel for acceptance of the head of a bolt for adjustable attachment with the support joist. Also, the support rail may have a C-slot channel for retaining electrical wires. Clips are used to secure each panel to upper wall portions of the underlying support rails. Each clip has a generally U-shaped gasket and is connected to a corresponding support rail through a threaded hole in the top wall of the support rail that receives a bolt or similar threaded fastener. Even though this support member can secure each panel to upper wall portions of underlying support rails, it cannot be utilized for holding the accessories of the PV system.

Various other bracket assemblies currently available are impossible to retrofit and snap firmly to existing rails without penetrating the modules. One bracket assembly provides an electronics module docking system having a docking member removably coupled to a photovoltaic module. The docking system includes a housing to enclose an electronics module. The power electronics module and the photovoltaic cells are electrically coupled to one another upon selective engagement of the connector ports. However, the process of attaching the electronics module to the photovoltaic module is difficult and requires a corner mounting which can result in re-work, increasing labor and material costs.

Therefore, there is a need for a bracket assembly that provides a bracket to attach solar accessories with the rail of the PV module. Such a bracket assembly would provide an efficient means of installation that does not penetrate through the solar module or the rail of the PV module. Such a bracket assembly would be capable of holding various PV accessories such as inverters, inverter trunk cable connectors etc. Such a needed device would provide a forked connection that separates via leverage as it slides over the PV module or the rail resulting in a squeezing grip. Such a bracket assembly would be designed for installation without the need for additional hardware and corner support. This bracket assembly would also provide wire management resulting in less abrasion of the wires against the roof surfaces thereby eliminating potential faults. This bracket assembly would directly attach to the solar module without penetrating it, thereby increasing the efficiency of the PV module. Finally, such a needed bracket assembly would simply wrap around a module frame with the capability to hold a variety of PV accessories.

SUMMARY OF THE DISCLOSURE

To minimize the limitations found in the prior art, and to minimize other limitations that will be apparent upon the reading of the specifications, preferred embodiment of the present invention provides a bracket assembly for mounting a plurality of photovoltaic (PV) accessories to a photovoltaic (PV) system, and a method for mounting the bracket assembly. The bracket assembly comprises a first bracket and a second bracket that attach the plurality of photovoltaic (PV) accessories with the PV system without penetrating through the rail/module.

The first bracket comprises a first clamp member, a second clamp member and a tightening means. The first clamp member includes a first plate, a second plate with an opening and a pair of first flanges. The first plate and the second plate are attached to form an angle therebetween. Each of the pair of first flanges is attached to an outer end of the first plate and the second plate. The second clamp member includes a clamp plate having a slot and a pair of second flanges with each of the pair of second flanges being attached to a pair of opposite edges of the clamp plate. The tightening means is adaptable to slide through the opening on the second plate and the slot on the clamp plate and tightened to form the first bracket.

The second bracket comprises an attachment structure, a pair of arms and a plurality of flanges. The attachment structure has a pair of outer channels with a structural member connected therebetween and a middle channel attached and positioned at a lower plane with respect to the structural member. The pair of arms is attached to the attachment structure for holding the solar panel accessories. The plurality of flanges is attached to a distal end of the pair of outer channels and the middle channel to snap firmly with the rail and the plurality of flanges on the pair to hold the PV accessory firmly.

A first objective of the present invention is to provide a bracket assembly that mounts a plurality of PV accessories to the PV system without penetrating the rail/module.

A second objective of the present invention is to provide an efficient mounting means that does not require any additional material or corner mount for attaching the plurality of PV accessories to the PV module.

A third objective of the present invention is to provide a bracket assembly that can be directly mounted on the rail/module of the PV system.

A fourth objective of the present invention is to provide a forked connection that separates via leverage as it slides over the PV module/rail resulting in a squeezing grip Another objective of the present invention is to provide wire management resulting in less abrasion of the wires against the roof surfaces thereby eliminating potential faults.

Yet another objective of the present invention is to provide a bracket assembly that simply wrap around a module frame with the capability to hold a variety of PV accessories.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

FIGS. 9A-9B illustrate a perspective view of the first bracket utilized for mounting the plurality of photovoltaic (PV) accessories to the rail of the photovoltaic (PV) module in accordance with one embodiment of the present invention in use.

DETAILED DESCRIPTION OF THE DRAWINGS

Figure 2:
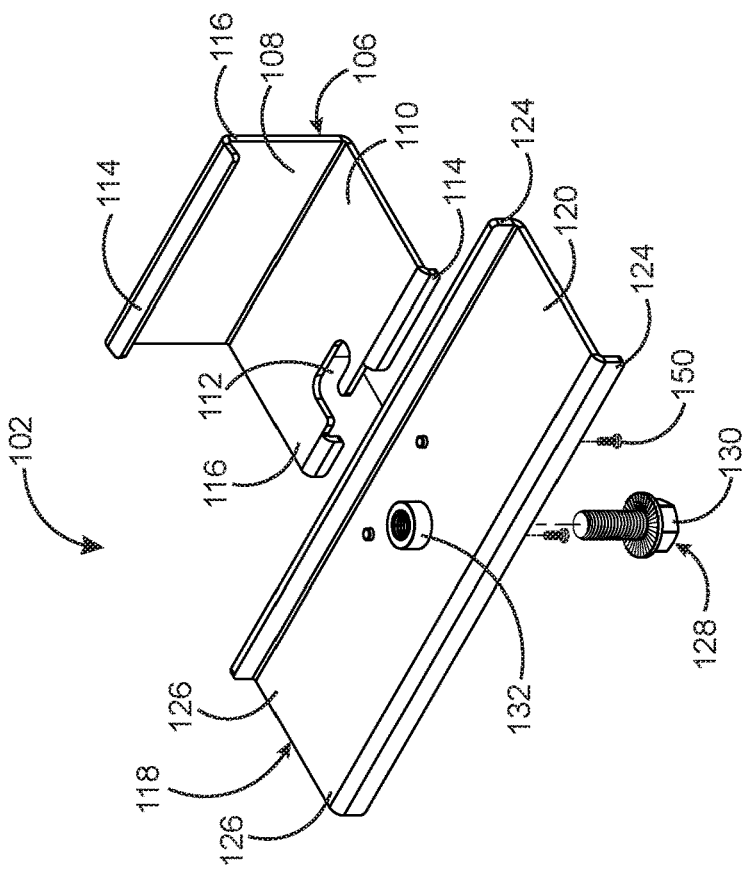
FIG. 2 illustrates an exploded view of the first bracket in accordance with the preferred embodiment of the present invention.

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

The present invention provides a bracket assembly 102, 104 and a method for mounting a plurality of photovoltaic (PV) accessories to a photovoltaic (PV) system. The bracket assembly 102, 104 may be mounted in a generally horizontal orientation, or in other orientations, such as a generally vertical orientation. Examples of the plurality of photovoltaic (PV) accessories include micro-inverters, wire management for micro-inverters, junction boxes, security devices and the like. The bracket assembly 102, 104 can be mounted on a rail/module of the PV system without penetrating through it. The bracket assembly 102, 104 comprises a first bracket 102 and a second bracket 104 that snaps easily with the rail 148 of a PV module 602 (see FIG. 6A).

Figure 1:
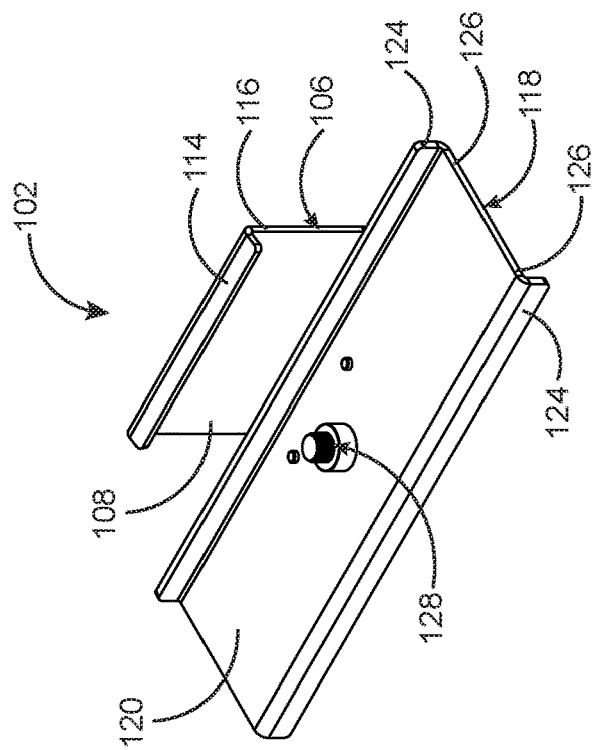
FIG. 1 illustrates a perspective view of a first bracket utilized for mounting a plurality of photovoltaic (PV) accessories to a rail of a photovoltaic (PV) module in accordance with the preferred embodiment of the present invention.

Turning to FIGS. 1 and 2, a perspective view and an exploded view of the first bracket 102 in accordance with the preferred embodiment of the present invention is illustrated. The first bracket 102 comprises a first clamp member 106, a second clamp member 118 and a tightening means 128 for attaching the first clamp member 106 and the second clamp member 118 to the rail 148 along with a PV accessory 146 (see FIG. 6B). The first clamp member 106 includes a first plate 108, a second plate 110 having an slot 112 and a pair of first flanges 114. The first plate 108 and the second plate 110 are attached to form an angle therebetween. Each of the pair of first flanges 114 is attached to an outer end 116 of the first plate 108 and the second plate 110. The second clamp member 118 includes a clamp plate 120 having a aperture 122 and a pair of second flanges 124 with each of the pair of second flanges 124 being attached to a pair of opposite edges 126 of the clamp plate 120. The tightening means 128 is a screw 130 and a nut 132. Typically, the tightening means 128 is a serrated flange cap screw made of special stainless steel to provide high corrosion resistance. For example, the screw 130 has a 5/16 inch nominal diameter with 24 UNF-2A threads. The tightening means 128 is adaptable to slide through the slot 112 on the second plate 110 and the aperture 122 on the clamp plate 120 and tightened to form the first bracket 102. A plurality of grounding pins 150 is present on the second clamp member 118. The PV accessory 146 is placed between the first clamp member 106 and the second clamp member 118 and tightened with the tightening means 128 to the rail 148 of the PV module 602 (see FIG. 6A).

Figure 3C:
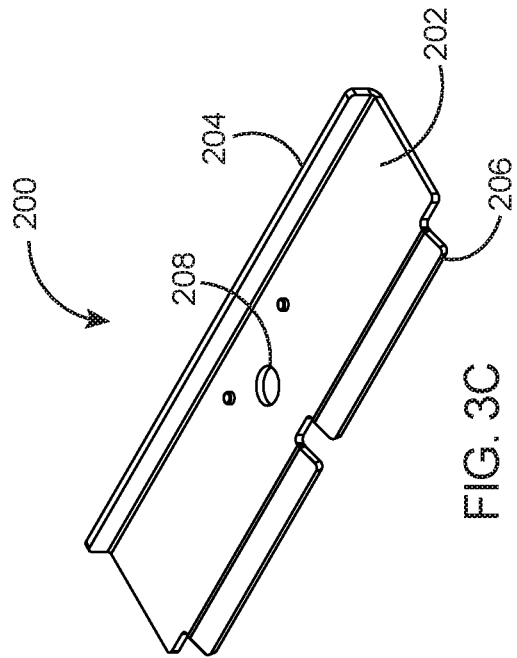
FIG. 3C illustrates a perspective view of the second clamp member of the first bracket in accordance with one embodiment of the present invention.
Figure 3B:
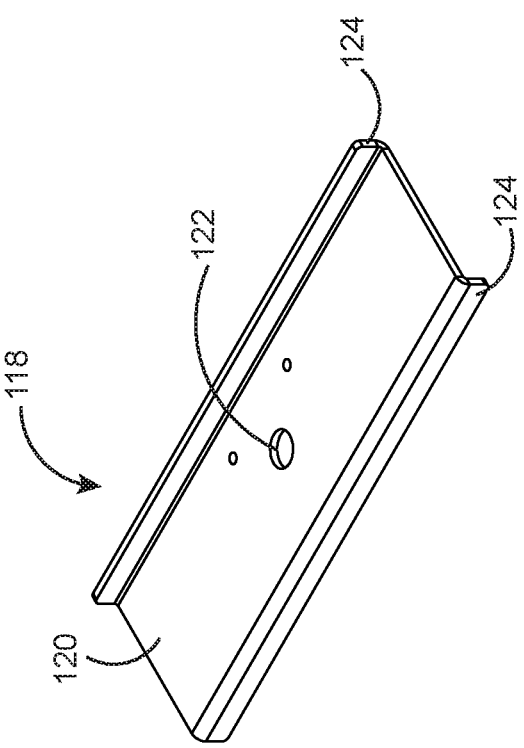
FIG. 3B illustrates a perspective view of a second clamp member of the first bracket in accordance with the preferred embodiment of the present invention.
Figure 3A:
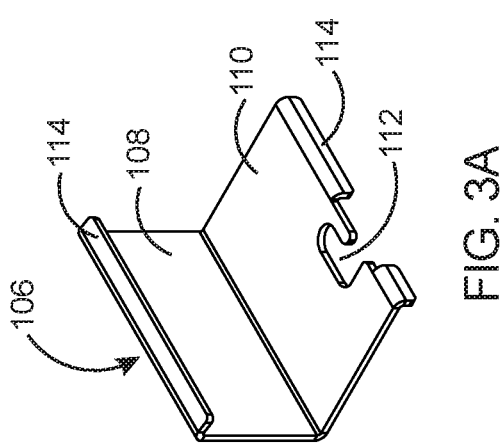
FIG. 3A illustrates a perspective view of a first clamp member of the first bracket in accordance with the preferred embodiment of the present invention.

Referring to FIGS. 3A-3C, the first clamp member 106 of the first bracket 102 is illustrated in FIG. 3A. The first clamp member 106 is positioned and held firmly around the rail 148 of the PV module 602 (see FIG. 6A) by the pair of first flanges 114. The pair of first flanges 114 and the angular geometry of the first clamp member 106 enable it to fix firmly with the rail 148. The second clamp member 118 as illustrated in FIG. 3B is positioned over the first clamp member 106 in such a way that the slot 112 on the second plate 110 coincides with the aperture 122 on the clamp plate 120. The first clamp member 106 and the second clamp member 118 are held by the tightening means 128 (see FIG. 2). FIG. 3C illustrates one embodiment of a second clamp member 200 having a clamp plate 202 with a first flange 204 attached perpendicular with the clamp plate 202 and a second flange 206 attached in the same plane with the clamp plate 202. The clamp plate 202 has an opening 208 that coincides with the aperture 122 on the clamp plate 120 of the first clamp member 106 through which the tightening means 128 (see FIG. 2) is inserted to hold the PV accessory. The method of attaching various accessories remains the same whereas the selection of various embodiments of the second clamp member 118 depends on the accessory to be held.

Figure 3E:
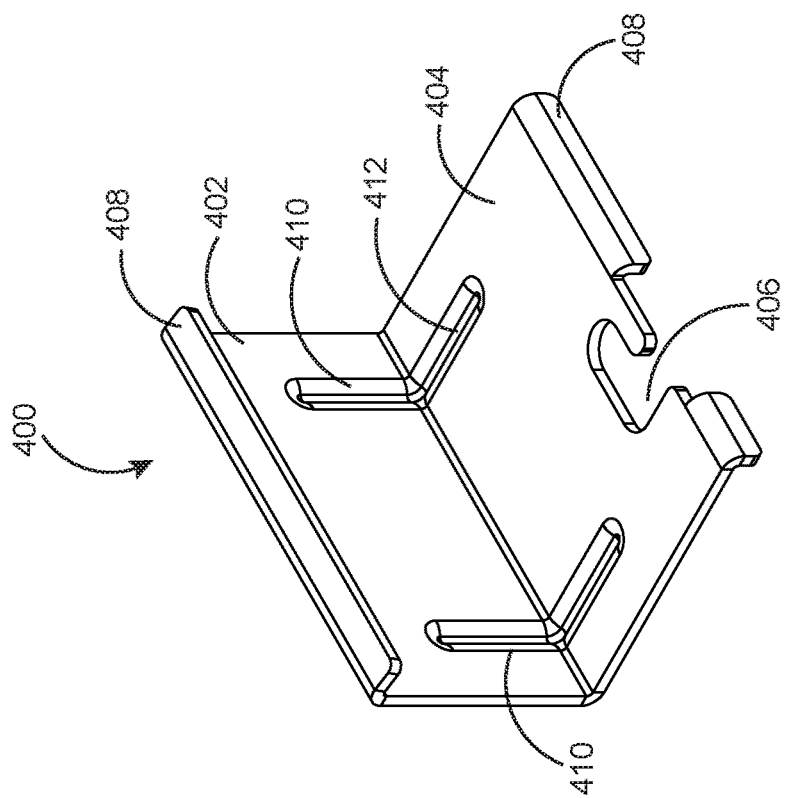
FIG. 3E illustrates a front perspective view of the first clamp member of the first bracket in accordance with one embodiment of the present invention.
Figure 3D:
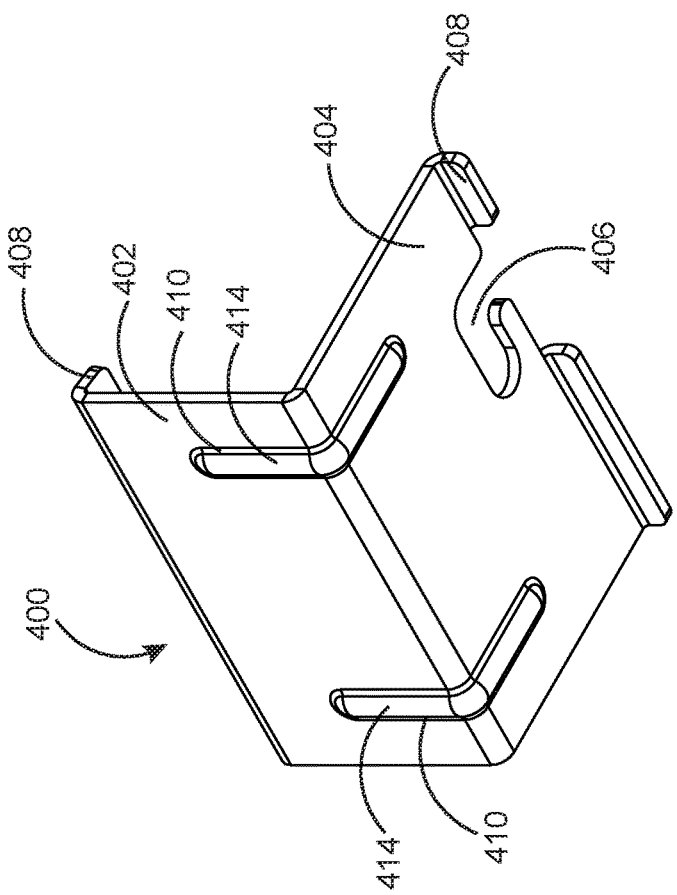
FIG. 3D illustrates a rear perspective view of a first clamp member of the first bracket in accordance with one embodiment of the present invention.

Referring to FIGS. 3D and 3E, a rear perspective view and a front perspective view of a first clamp member 400 in accordance with one embodiment of the present invention are illustrated respectively. The first clamp member 400 includes a first plate 402, a second plate 404 having an opening 406, a pair of first flanges 408 and a plurality of ribs 410. The first plate 402 and the second plate 404 are attached to form an angle therebetween. Each of the plurality of ribs 410 includes a cavity 412 and a protrusion 414 that provides structural support. The plurality of ribs 410 run from the first plate 402 to the second plate 404 to provide additional structural support. Each of the pair of first flanges 408 is attached to the first plate 402 and the second plate 404.

Figure 4:
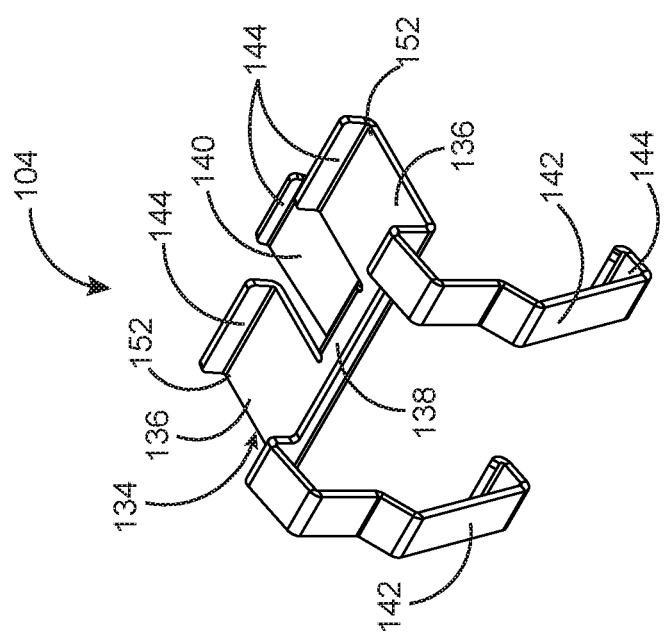
FIG. 4 illustrates a perspective view of a second bracket employed for mounting the plurality of photovoltaic (PV) accessories to the rail/module of a photovoltaic (PV) system in accordance with the preferred embodiment of the present invention.

FIG. 4 illustrates a perspective view of a second bracket 104 in accordance with the preferred embodiment of the present invention. The second bracket 104 for holding the PV accessory 146 comprises an attachment structure 134, a pair of arms 142 and a plurality of flanges 144. Preferably, the second bracket 104 can be utilized for holding PV accessories such as trunk cable connectors and the like. The attachment structure 134 has a pair of outer channels 136 with a structural member 138 connected therebetween and a middle channel 140 attached and positioned at a lower plane with respect to the structural member 138. The pair of arms 142 is attached to the attachment structure 134 for holding the solar panel accessories. The plurality of flanges 144 is attached to a distal end 152 of the pair of outer channels 136 and the middle channel 140 to snap firmly with the rail 148. The plurality of flanges 144 on the pair of arms 142 holds the PV accessory 146 firmly.

Figure 5:
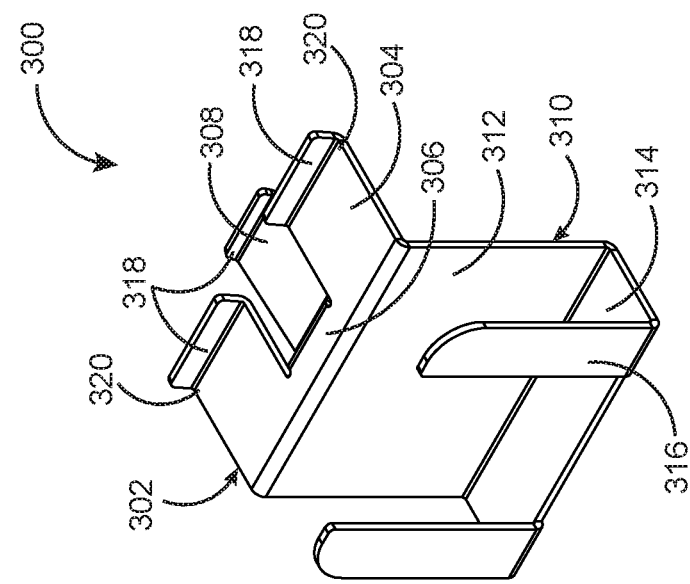
FIG. 5 illustrates a perspective view of the second bracket in accordance with one embodiment of the present invention.

FIG. 5 illustrates a perspective view of one embodiment of a second bracket 300 in accordance with of the present invention. The second bracket 300 comprises an attachment structure 302, a holding structure 310 and a pair of arms 316 for holding the PV accessory 146. The attachment structure 302 includes a pair of outer channels 304 with a structural member 306 connected therebetween and a middle channel 308 attached and positioned at a lower plane with the structural member 306. A plurality of flanges 318 is attached to a distal end 320 of the pair of outer channels 304 and the middle channel 308 so as to snap firmly with the rail 148 of the PV module 602 (see FIG. 6A). The holding structure 310 has a first holding member 312 and a second holding member 314 attached to form an angle therebetween. The first holding member 312 is attached with the structural member 302 and the second holding member 314 is attached with the pair of arms 316. The PV accessory 146 is positioned between the holding structure 310 and the pair of arms 316.

Figure 6A:
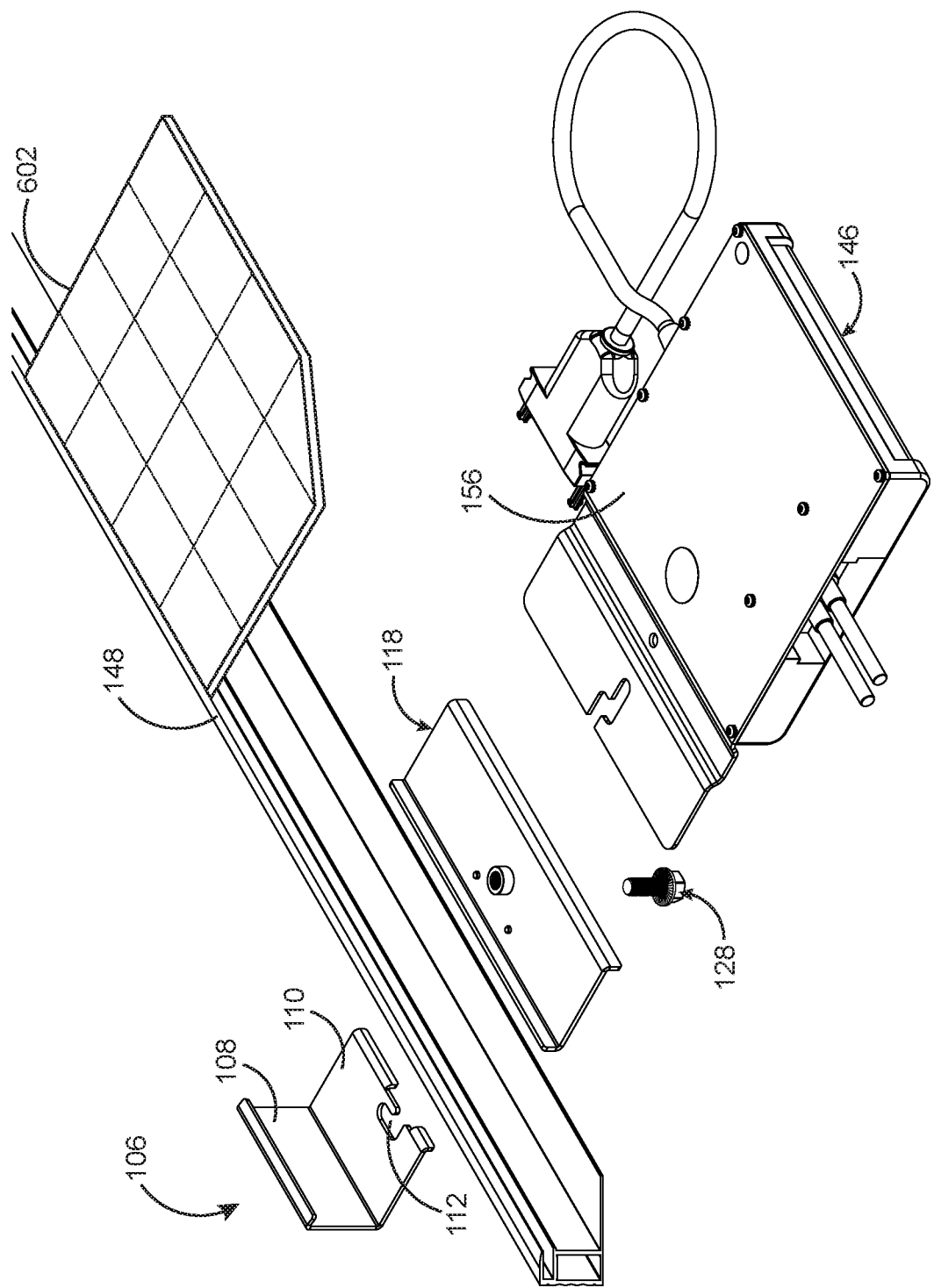
FIGS. 6A-6B illustrate perspective views of the first bracket utilized for mounting the photovoltaic (PV) accessory such as a micro-inverter to the rail/module of the photovoltaic (PV) system in accordance with the preferred embodiment of the present invention in use.
Figure 6B:
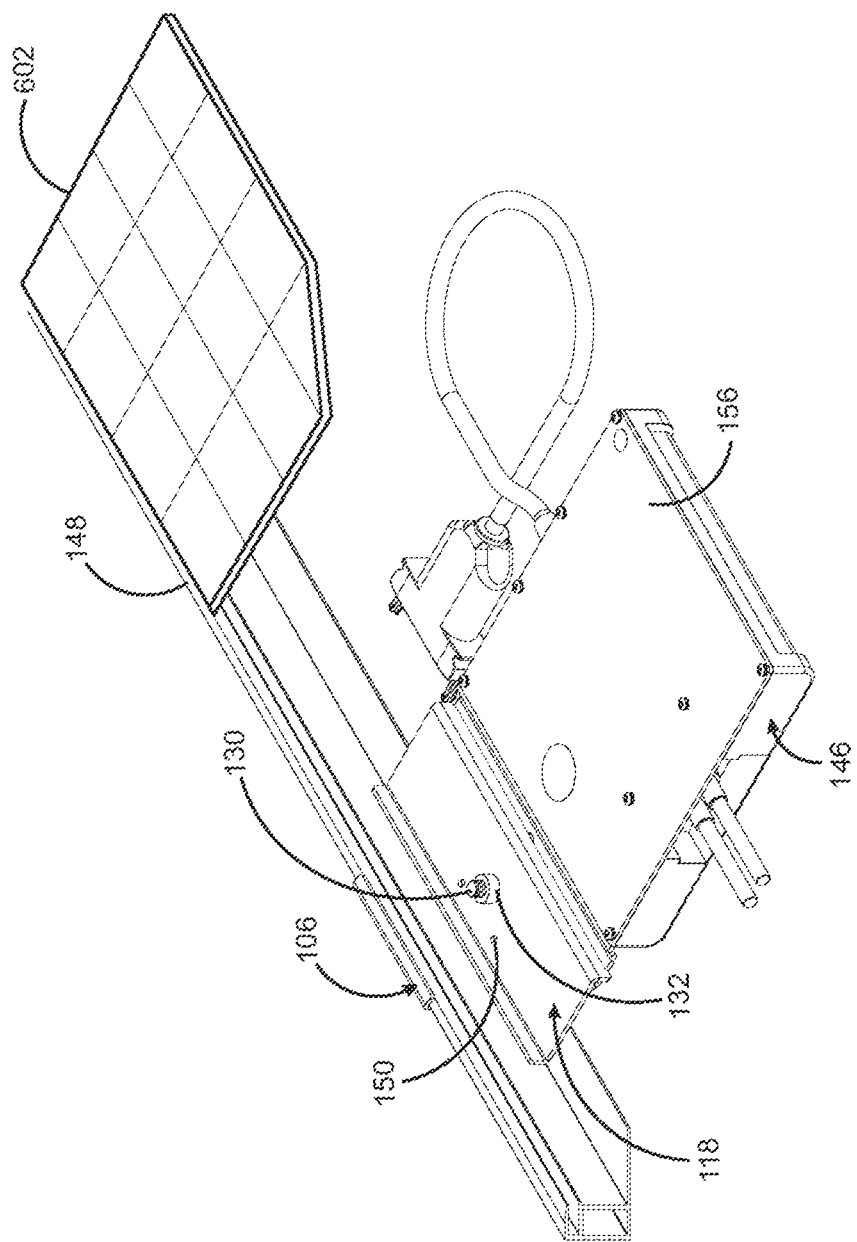

Referring to FIGS. 6A-6B, the first bracket 102 utilized for mounting the photovoltaic (PV) accessory 146, for example, a micro-inverter 156 to the rail 148 of the photovoltaic (PV) module 602 in accordance with the preferred embodiment of the present invention is illustrated. The method for mounting the PV accessory 146 to the rail 148 utilizing the first bracket 102 includes positioning the second clamp member 118 of the first bracket 102 and the PV accessory 146 such that the aperture 122 on the clamp plate 120 and an opening on the PV accessory 146 coincide. Insert the tightening means 128 through the aperture 122 on the clamp plate 120. Positioning the first clamp member 106 over the rails 148 of the PV module 602 and aligning the second clamp member 118 such that the tightening means 128 engages with the opening 112 on the second plate 110. Tightening the tightening means 128 so that the first bracket 102 snaps to the rail 148 and holds the PV accessory 146 firmly is illustrated in FIG. 6B. The first bracket 102 allows clipping around and locking the plurality of accessories 146 with the rail 148 without penetrating.

Figure 7:
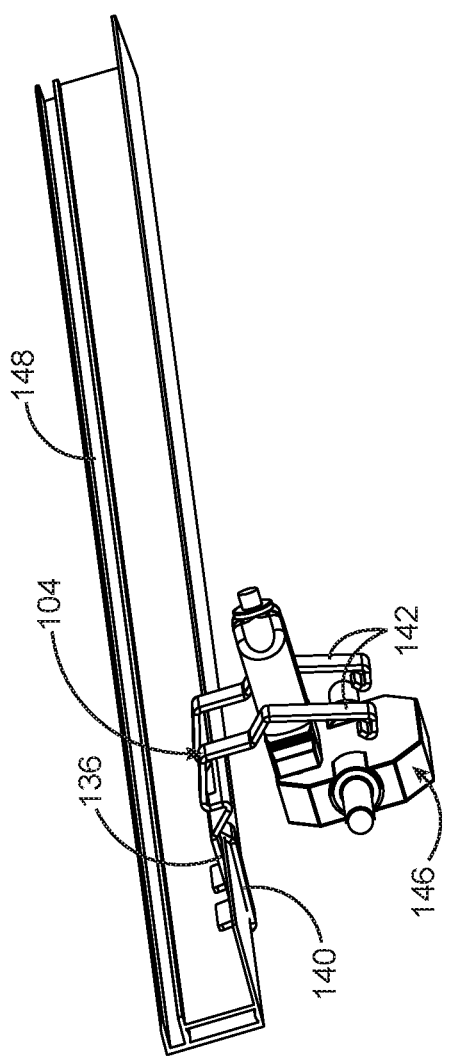
FIG. 7 illustrates a perspective view of the second bracket mounting the photovoltaic (PV) accessory to the rail of the photovoltaic (PV) module in accordance with the preferred embodiment of the present invention.

In FIG. 7, the photovoltaic (PV) accessory 146 mounted to the rail 148 of the photovoltaic (PV) module 602 (see FIG. 6A) utilizing the second bracket 104 in accordance with the preferred embodiment of the present invention is illustrated. The method includes positioning the PV accessory between the pair of arms 142 of the second bracket 104 and snapping the attachment structure 134 (see FIG. 4) to the rail 148 of the PV module 602 (see FIG. 6A) such that the pair of outer channels 136 and the middle channel 140 separates via leverage as it slides over and fix firmly with the rail 148 of the PV module 602 (see FIG. 6A).

Figure 8:
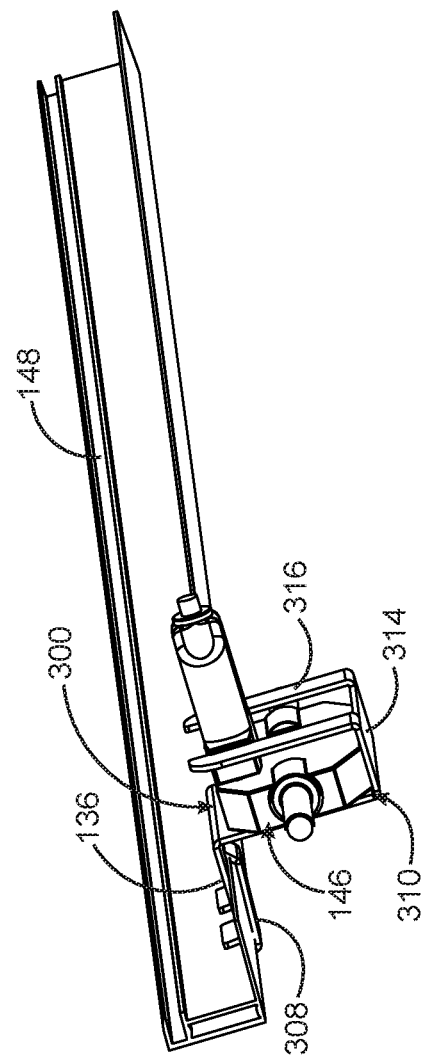
FIG. 8 illustrates a perspective view of the second bracket mounting the photovoltaic (PV) accessory to the rail of the photovoltaic (PV) module in accordance with one embodiment of the present invention.

FIG. 8 illustrates one embodiment of the second bracket 300 utilized for mounting the photovoltaic (PV) accessory 146. The photovoltaic (PV) accessory 146 is positioned on the holding structure 310 as illustrated in FIG. 8. The first holding member 312 and the second holding member 314 form an angle therebetween and secure the PV accessory along with the pair of arms 316.

Figure 9B:
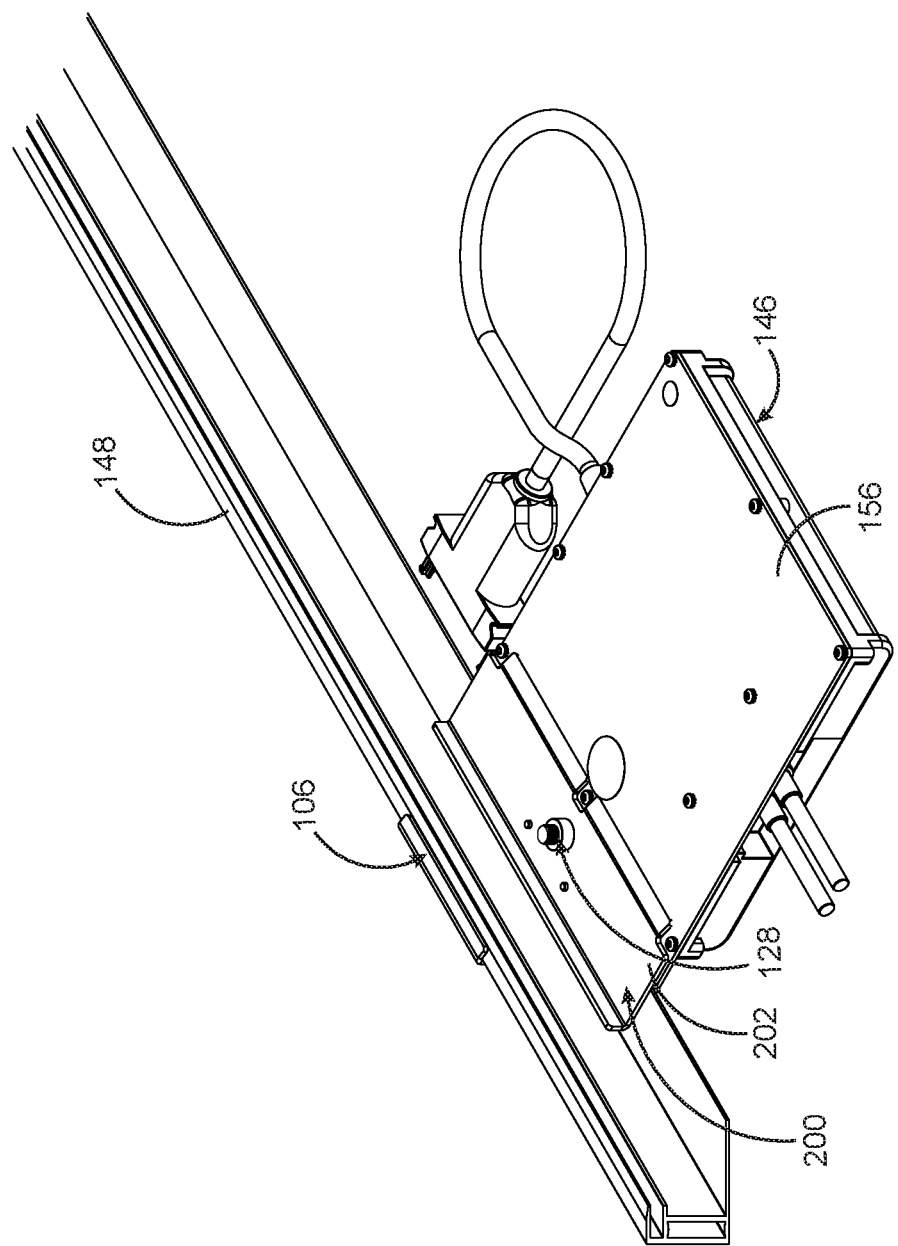

Referring to FIGS. 9A-9B, a perspective view of one embodiment of the first bracket in accordance with of the present invention in use is illustrated. In this embodiment of the present invention, the second clamp member 200 has a clamp plate 202 with a first flange 204 attached perpendicular with the clamp plate 202 and a second flange attached in the same plane with the clamp plate 202. The PV accessory 146 is positioned between the second clamp member 200 and the first clamp member 106 and attached to the rail 148 by tightening the tightening means 128.

Figure 10:
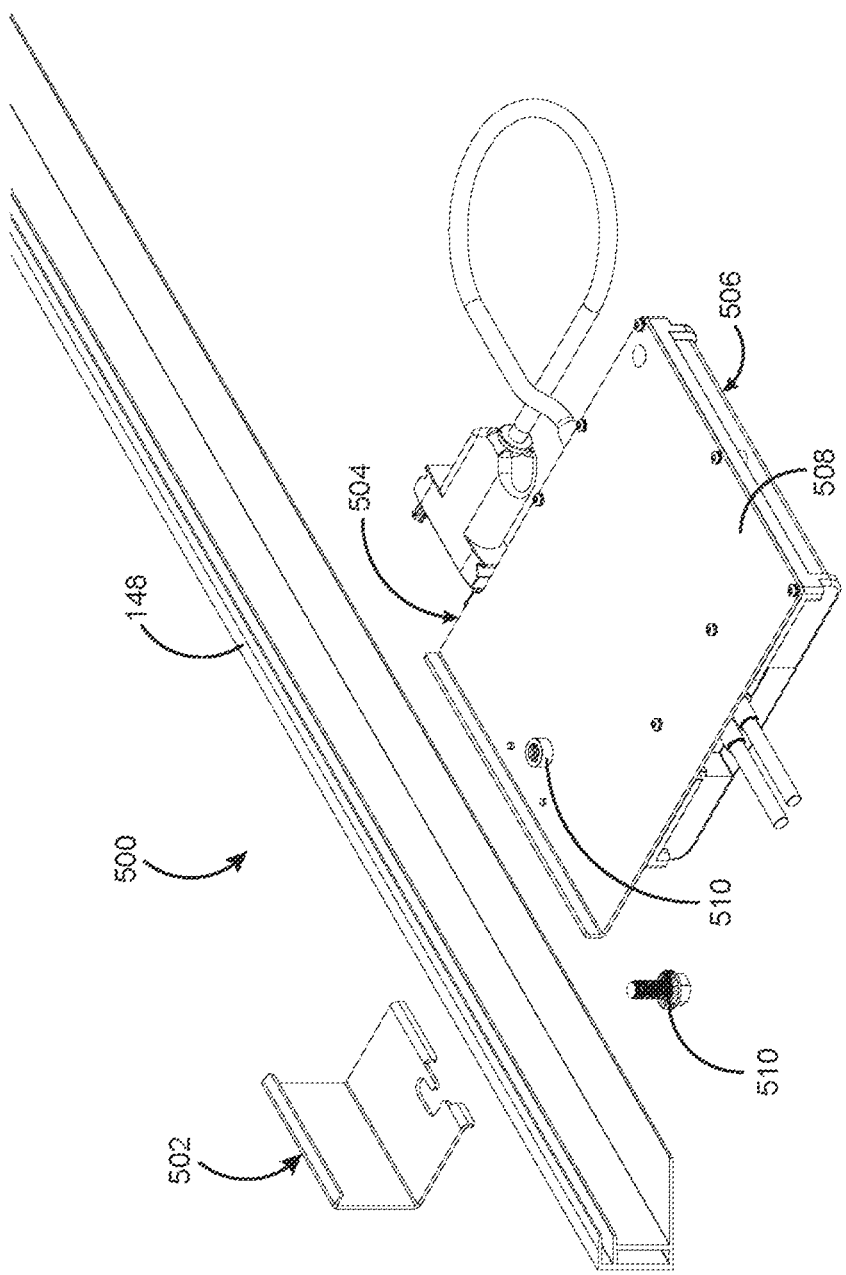
FIG. 10 illustrates a perspective view of a first bracket having a second clamp member integrated with the photovoltaic (PV) accessory as a single piece in accordance with one embodiment of the present invention.

FIG. 10 illustrates a perspective view of a first bracket 500 having a second clamp member 504 integrated with the photovoltaic (PV) accessory 506 as a single piece in accordance with one embodiment of the present invention. In this embodiment, the second clamp member 504 and the photovoltaic (PV) accessory 506 are fused together to form a single piece. The photovoltaic (PV) accessory 506 includes a micro-inverter 508 which is fused with the second clamp member 504 as illustrated in FIG. 10. The first clamp member 502 is positioned and held around the rail 148. The single piece second clamp member 504 with the photovoltaic (PV) accessory 506 is attached to the rail 148 by means of the tightening means 510.

The present invention is preferably positioned under the solar panel and allows for easy connection of various PV accessories such as micro inverters, wire management for micro inverters, trunk cable connectors, junction boxes, security devices, fire repression equipment etc. The presently disclosed bracket assembly 102, 104 is advantageous as it allows the clipping of the PV accessory 146 directly to the side of the module/rail and does not penetrate through them. The present invention is preferably made from an alloy of aluminum and more particularly from 5052-H32 aluminum. The pair of outer channels 136 and the middle channel 140 forms a forked connection that separates via leverage as it slides over the rail 148 of the PV module 602 (see FIG. 6A) and snaps into place without any corner support. The bracket assembly 102, 104 can be squeezed into the rail 148 to grip the PV accessory 146 without utilizing any additional hardware. The bracket assembly 102, 104 can be simply wrapped around the rail 148 with or without the tightening means 128 and is available in different sizes for the variety of solar panel frame thickness.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. A bracket assembly for mounting an accessory to a photovoltaic (PV) system, the bracket assembly comprising:
a first bracket for attaching the accessory to a rail of a photovoltaic (PV) module, the first bracket consisting of a first and second clamp member and a tightening means:
the first clamp member having a first plate (108), a second plate (110) with an open ended slot (112), the first plate and the second plate being attached to one another to form an angle therebetween;
the second clamp member (118) having a substantially planar clamp plate (120) with a hole (122) and a first and second flange together making a pair of flanges (124), wherein the first flange is attached to and extends away from a first edge of the clamp plate (120) and the second flange is attached to and extends away from a second clamp plate edge opposite said first clamp plate edge of the clamp plate (120), wherein a nut is positioned on the hole (122) of the clamp plate (120), and wherein the second clamp member is a monolithic piece;
wherein one flange of the pair is angled towards the photovoltaic (PV) module and another flange of the pair is angled away from the photovoltaic (PV) module; and
wherein the tightening means (128) attaches both the first clamp member and the second clamp member to both the rail and the accessory, the tightening means being a screw configured to slidably pass through the open ended slot (112) on the second plate and the clamp plate nut; and
whereby the first bracket holds the rail of the PV module and holds the accessory without penetrating through the rail of the PV module.

2. The bracket assembly of claim 1 wherein one of the flanges defines a space between the clamp plate and the accessory.

3. The bracket assembly of claim 1 wherein the bracket assembly includes a plurality of grounding pins.

4. The bracket assembly of claim 1 wherein the second clamp member is integral with the accessory.

5. The bracket assembly of claim 1 wherein the screw is slid through the open ended slot on the second plate and the hole on the clamp plate and tightened with the nut to form the first bracket.

6. The bracket assembly of claim 1 wherein the first bracket holds the accessory without penetrating through the PV module of the PV system.

7. The bracket assembly of claim 1 wherein the bracket assembly is clipped to a side of the PV module or the rail of the PV module.

8. A bracket assembly for mounting an accessory to a photovoltaic (PV) system, the bracket assembly comprising:
a first bracket for holding the accessory, the first bracket consisting of a first and second clamp member and a tightening means:
the first clamp member having a first plate attached to a second plate having an open ended slot, the first plate and the second plate being attached to one another to form an angle therebetween;
the second clamp member having a substantially planar clamp plate (120) with a hole and a pair of flanges, each of the pair of flanges being attached to and extending away from a pair of opposite edges of the clamp plate, wherein the second clamp member is integral with the accessory; and
wherein the tightening means (128) attaches both the first clamp member and the accessory to a rail, the tightening means comprising a nut positioned on said hole of the substantially planar clamp plate (120), and wherein the second clamp member is a monolithic piece;

whereby the first bracket holds the accessory without penetrating through the rail of a PV module.

9. The bracket assembly of claim 8 wherein the bracket assembly is positioned under the PV module and allows for the connection of the accessory.

10. The bracket assembly of claim 8 wherein the bracket assembly is configured to clip to a side of the PV module and not penetrate the PV module.

11. The bracket assembly of claim 8 wherein the bracket assembly is configured to clip around and lock with the rail without penetrating the rail.

12. The bracket assembly of claim 8 wherein the tightening means is a screw and the nut inserted through the open ended slot on the second plate and the hole on the clamp plate for attaching the first clamp member, the second clamp member and the accessory to the rail of the PV module.

13. The bracket assembly of claim 12 wherein the screw is a cap screw.

14. The bracket assembly of claim 8 wherein the nut is a self-clinching nut.

* * * * *